W. CHURCHILL.
CATADIOPTRIC PROJECTOR.
APPLICATION FILED JAN. 12, 1917.
1,438,360.
Patented Dec. 12, 1922.
2 SHEETS—SHEET 1.
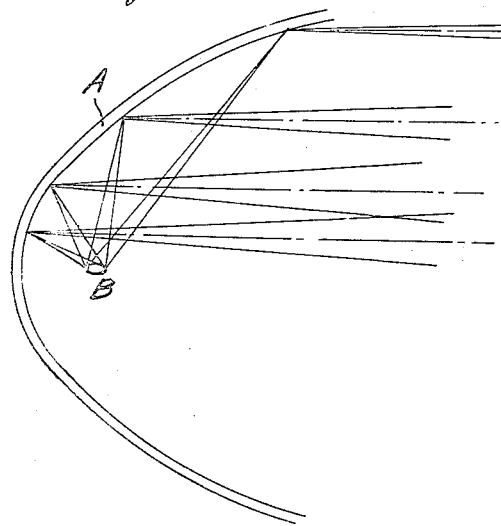
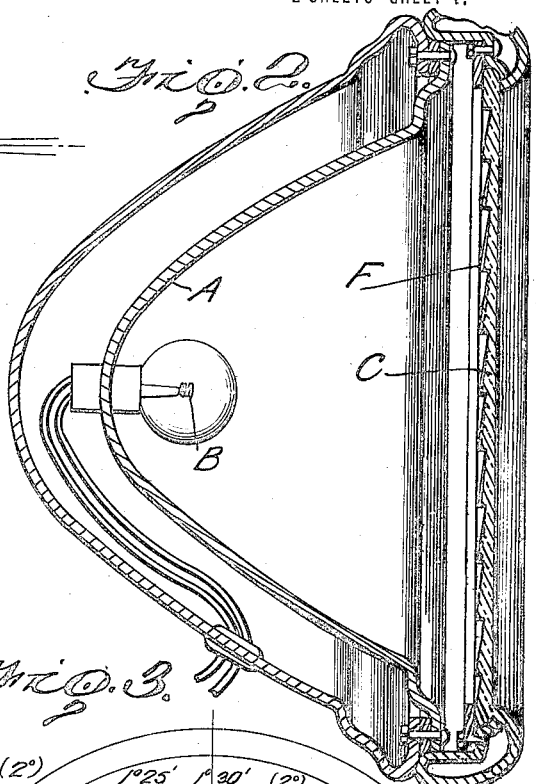
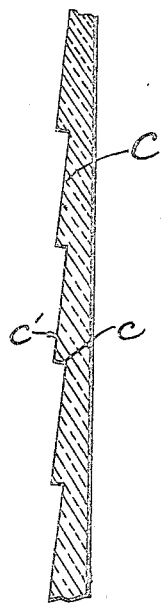
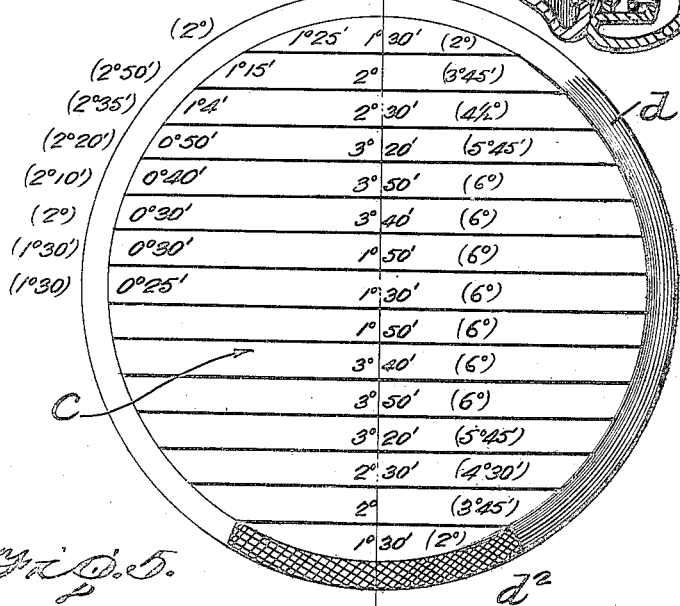

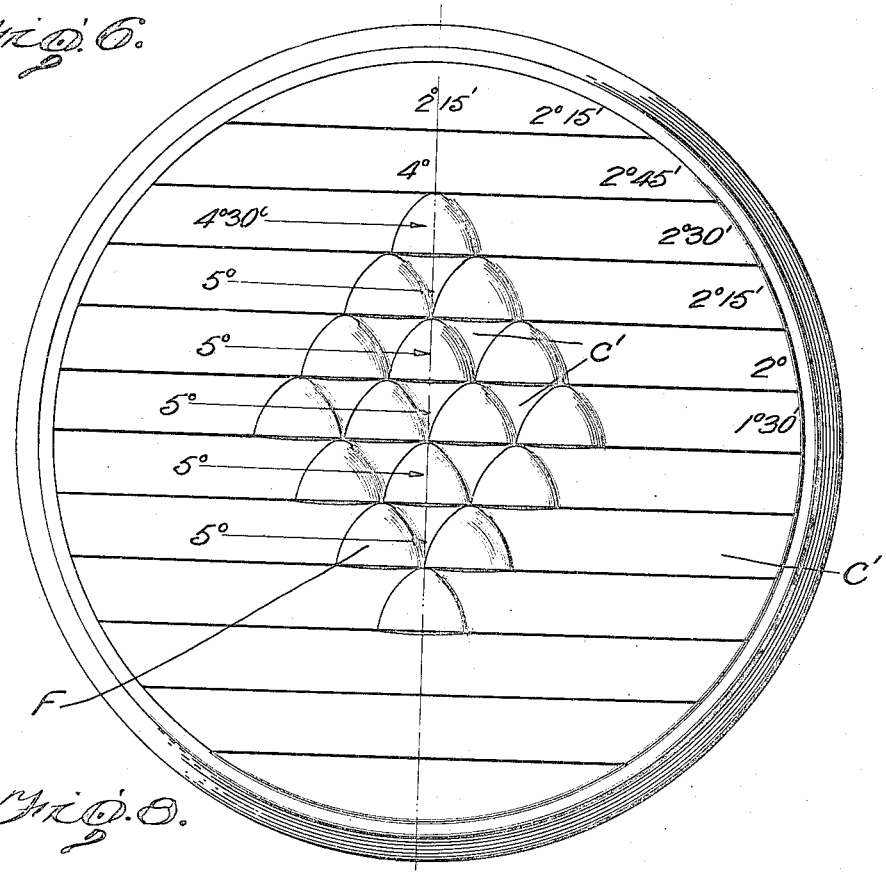
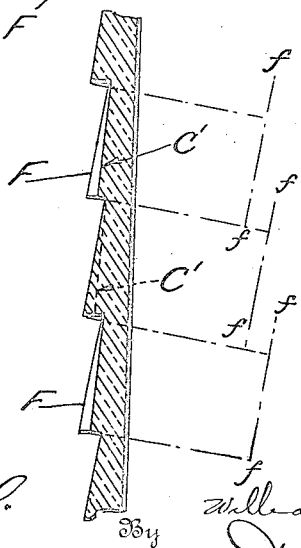

Patented Dec. 12, 1922.

1,438,360

UNITED STATES PATENT OFFICE.

WILLIAM CHURCHILL, OF CORNING, NEW YORK, ASSIGNOR TO CORNING GLASS WORKS, OF CORNING, NEW YORK, A CORPORATION OF NEW YORK.

CATADIOPTRIC PROJECTOR.

Application filed January 12, 1917. Serial No. 142,094.

*To all whom it may concern:*

Be it known that I, WILLIAM CHURCHILL, a citizen of the United States of America, and a resident of Corning, New York, have invented certain new and useful Improvements in Catadioptric Projectors, of which the following is a specification.

Parabolic mirrors are in common use as reflectors behind light sources, and are generally regarded as projecting, with properly situated sources, a beam of parallel rays. However, as no light source in use (electric or other lamps) is merely an emissive point, but is of appreciable size, it follows that the light source is not concentrated at the focal point of the reflector, but if centered as well as may be in respect to the reflector, is also located outside and around such point. Light from such outside portions of the source, is after reflection by the mirror, not projected parallel with the principal axis of the mirror, as is light from the focal point, but is projected at an angle thereto, the reflected rays from any outside point of the source being projected towards the same side of the principal point, as is the point from which they emanate. Thus, in practice a parabolic mirror produces a beam which in cross section has no sharply defined limit, the central portion thereof being of fairly uniform intensity and surrounded by a zone of less strength, and as this zone is due to rays divergent from the axis of the mirror, the beam projected by the mirror is not cylindrical, but divergent. This spreading of the beam is objectionable for certain purposes, as in photographic work where it is desired to strongly illuminate a selected part of the field of the camera artificially without illuminating adjacent parts of the field by the same source, or in vehicle headlights in which it is desirable to avoid any projection of the light above the horizontal.

It has been proposed to place prisms on the cover glass and to thereby bend the beam projected from the reflector as a whole. While this can readily be done, unless attention is paid to the characteristics of the beam so projected, it will result in either an unequal deflection of different parts of the beam, so that while rays from certain parts of the reflector are refracted to the desired extent, rays from other parts are not so treated, or else in an unnecessary and undesired deflection of the beam at the expense of the distant illumination.

It is the object of this invention to provide a construction in which the deflection of the several parts of the beam projected by the reflector will have proper relation to the initial direction of such parts as reflected, so that the upper edge of the beam will be sharply defined, permitting effective illumination up to such limit and preventing blinding glares at points above such limits. For these purposes it consists in the cover glass hereinafter described.

Referring to the drawings in which corresponding parts are designated by corresponding marks of reference,—

Figure 1 is a diagrammatic view showing the divergence produced by a parabolic reflector and certain light sources.

Figure 2 is a vertical section of a system embodying my invention.

Figure 3 is a rear view of the cover glass thereof.

Figure 4 is an enlarged vertical fragmental section.

Figure 5 is a horizontal section.

Figure 6 is a rear view of a cover glass made in accordance with this invention, and having dispersive ribs thereon.

Figure 7 is an enlarged vertical section thereof, and

Figure 8 is a horizontal section thereof.

In the following description, I will explain this invention with particular reference to its application to automobile headlights.

Considering Figure 1, which shows light projected from several zones or parts of parabolic mirror A with a light source B in the form of a helical filament $\frac{1}{8}$ of an inch long and $\frac{1}{32}$ of an inch thick located at the focal point thereof, it will be noted that the rays projected from different points of the reflector vary in spread, the minimum being at the optical center of the system, and the maximum spread being due to points slightly removed from such center, while the spread again decreases as the edge of the reflector is reached.

Considering Figure 1 as being a vertical section, it will be seen that the spread before referred to causes the undesired upward projection of the beam above the optical axis, the spread of the rays from the several points being different, and causing a variation in the vertical spread.

Considering Figure 1 as a horizontal section, the spread indicated thereby is purely a lateral spread.

If Figure 1 is considered as an inclined section, the divergence indicated has a vertical component, which produces the effects above noted as due to vertical divergence, and moreover, the diameter of the filament produces in itself, a more or less vertical divergence of rays reflected from the points of the reflector away from the vertical plane in which is located the optical axis. The vertical spread of the rays projected forwardly by the projector through different horizontal zones of the cover glass, and at the centre and ends of such zones are indicated for the filament in Figure 3 in the numerals not enclosed in brackets. A change in certain characteristics of the filament necessarily produces a change in the values indicated, although in all cases it will be true, generally speaking, that there will be a zone of maximum divergence surrounding the optical axis of the system, and that the divergence from points outside of such zone will decrease towards the edge of the reflector. If the light source be a spherical body, the point of maximum divergence may be in the optical center, but in any event the spread produced by each point of the reflector will have a vertical component, which, while it may vary in amount from values indicated in Figure 3, will not vary in character therefrom, and it is a purpose of this invention to so shape the faces on the cover glass that their refracting power will be so related to the divergence from the principal axes of rays falling on a reflector from a source of commercial character that the upper edge of the projected beam will be sharply defined.

For this purpose, the cover glass is made in the form of a series of horizontal prisms C, whose bases are downward. By preference as shown, this is done by stepping the inner face of the cover glass into a series of horizontal zones, each zone having a lower face $c$, and an inclined face $c'$ arising therefrom and extending to the base or the lower face of the zone located thereabove. The angle formed between the inner faces $c$ and the optical axis of the system varies in the different zones and in the different parts of the same zone as is shown in the non-bracketed values at the centers and ends of several of the prisms. This results in giving to the prisms a thickened center as shown in Figure 5. To produce a beam whose upper edge is parallel with the optical axis of the system, the angle above referred to of each point on each zone should be such as to correct the divergence of the rays at such point having regard for the particular reflector and light source employed, and the cover glass should be selected with this end in view.

Generally speaking, it is inconvenient in commercial work, to provide for this exact correction, owing to the variation in lamps, in the location of the lamps in and in respect to the reflector, and in the reflectors themselves, and, therefore, I prefer to so form the cover glasses that they will have corrective values suitable for use in connection with any system giving a certain selected maximum spread. For systems giving less spread, there will be over correction. As a specific illustration of good corrective values, adapted for use in connection with systems in commercial use, I refer to the numbers embraced in brackets in Figure 3, showing the degree of divergence for which the prisms may be formed. An over-correction results in the upper limit of the projected ray being slightly convergent forwardly towards the axis of the beam, and thus insures against upward projection, even though the optical axis be not exactly horizontal, and brings the upper limit of the beam to ground when used in connection with an automobile head-light, and thus utilizes it.

It will be noted that the departure from the corrective value indicated for the specific filament shown in Figure 1 is different at different points. I have found it desirable to make this difference greater for the central zones than for those at the top and bottom as the light source actually employed may be of greater vertical diameter than the one for which the values are plotted, with a resultant increase in the divergence of the rays passing through the central zones. This over-correction for the particular case plotted is a compromise to provide ability to take cover glasses from stock without regard to the particular lamp employed.

With the selected values shown, the cover glass may be considered as formed of a central and upper and lower group of prisms. The central group comprises the seven marked with six degrees, corrective value. These are therefore similar. In the particular case shown, the upper and lower groups each comprise prisms of gradually decreasing less corrective value.

The increased corrective value given to central portions of the several zones over that given to the ends thereof, results in causing each prism to be somewhat concentrating in respect to the lateral spread, and for the purpose of neutralizing or over-coming this as may be desired, and to give side illumination, which is sometimes desirable, I may, if I desire, form upon the cover glass and specifically and preferably on the central part thereof, a series of ribs F having lateral diffusive power.

By preference, these ribs are, as illustrated in Figures 6, 7 and 8, superposed on the prisms, having their major axes at right angles to the length of the latter; each rib being in the form of an ungula, whose refractive face is in vertical section inclined to the plane of the cover glass at a greater angle than is the prism face $c'$ on which it is imposed, or in other words having a greater thickness at the bottom than the top. The ribs can conveniently be formed as cylindrical ungulas, the cylindrical axes $f$—$f$ of which are at an angle of 2 degrees to the underlying prism. Between these ribs will be spaces formed by the faces $c'$ of the prism, the light passing through which will not be diffused. As the ribs cause a downward deflection of light passing therethrough, in order to obtain the same average vertical distribution I may reduce the corrective power of the prisms themselves. Values suitable for this arrangement are indicated in Figure 6.

It will be understood that by changes in the radius of curvature of the ribs, the amount of side divergence may be controlled, while the amount of light so spread will depend on how much of the face of the cover glass is covered by the ribs, but in any event the use of ribs of the character indicated will result in non-diffusive faces located will result in non-diffusive faces located on each prism in alternation with the ribs.

Considering Figure 2, it will be noted that the chamfered edge $d$ of the cover glass at the bottom thereof tends to refract upwardly the rays falling thereon so that the upwardly diverging ray passing through such edge is refracted still more upwardly and across the axis of the mirror. For the purpose of suppressing such light, I prefer if necessary or desirable, to sand-blast or otherwise mat the chamfered edge as is illustrated at $d^2$, although it will in practice be generally covered by the mounting in which it is held.

Having thus described my invention what I claim as new, and desire to secure by Letters Patent, is,—

A cover glass having thereon a series of similarly disposed substantially horizontal prisms arranged in a central and an upper and a lower group, the prisms of the upper and lower groups increasing in refractive power from the edge towards the center, while the central group of prisms are of substantially equal refractive power which is less than that of the most refractive prism of the other groups, each prism having less refractive power on its ends than on its center.

In testimony whereof I hereunto affix my signature.

WILLIAM CHURCHILL.